United States Patent
Harada et al.

[11] Patent Number: 5,561,977
[45] Date of Patent: Oct. 8, 1996

[54] METHOD OF OPERATING HEAVY OIL-BURNING GAS TURBINES

[75] Inventors: Yoshio Harada; Yoshiko Harada, both of Hyogo-ken; Takehico Morimoto, Tokyo, all of Japan

[73] Assignee: Toa Nekken Co., Ltd., Tokyo, Japan

[21] Appl. No.: 536,742

[22] Filed: Sep. 29, 1995

[30]   Foreign Application Priority Data

Jul. 4, 1995   [JP]   Japan ..................................... 7-168857

[51] Int. Cl.$^6$ .................................................... F02C 3/20
[52] U.S. Cl. ...................... 60/39.02; 60/39.33; 60/39.461
[58] Field of Search ................................ 60/39.02, 39.05, 60/39.33, 39.461, 39.464

[56]                References Cited

U.S. PATENT DOCUMENTS

| | | | |
|---|---|---|---|
| 2,689,456 | 9/1954 | White ..................................... | 60/39.461 |
| 2,966,029 | 12/1960 | Rocchini et al. ..................... | 60/39.461 |
| 2,968,148 | 1/1961 | Rocchini et al. ..................... | 60/39.461 |
| 4,089,689 | 5/1978 | Rigdon et al. ......................... | 106/14.28 |

OTHER PUBLICATIONS

Two Year Experience of Turbine Finning Residual Fuel ASME Paper 68-GT-11.

Ash in Gas Turbines Burning Magnesium-Treated Residual Fuel Trans. ASME Apr. (1994).

High-Temperature Corrosion in Gas Turbines and Steam Boilers by Fuel Impurities. II The Sodium Sulfate-Magnesium Sulfate-Vanadium Pentoxide System Ind. Eng. Chem. Prod. Res. Develop., vol. 12, No. 2, (1973).

High-Temperature Corrosion Gas Turnines and Steam Boilers by Fuel Impurities. IV-Evaluation of Silicon and Magnesium-silicon as Corrosion Inhibitors Trans. ASME Apr. (1974).

*Primary Examiner*—Louis J. Casaregola
*Attorney, Agent, or Firm*—Sughrue, Mion, Zinn, Macpeak & Seas

[57]                ABSTRACT

A method for efficient operation of a heavy oil-burning gas turbine which uses a fuel that has various high-melting point compounds added as corrosion inhibitors with a view to preventing the occurrence of corrosion at elevated temperatures. The amount of addition of the corrosion inhibitor in the initial period of turbine operation is such that the weight ratio of the effective metallic component (M) of the inhibitor to the corrosive component (V) of the fuel is set to lie within the range of M/V=2–5 and thereafter the addition of the inhibitor is reduced in either a stepwise or graded manner over a predetermined cycle of operation within one to six weeks until the amount of the inhibitor added at the end point is one to three tenths of the initial addition.

2 Claims, 1 Drawing Sheet

METHOD OF OPERATING HEAVY OIL-BURNING GAS TURBINES

BACKGROUND OF THE INVENTION

1. Field of the Invention

This invention relates to a method of efficient operation of heavy oil-fueled power generating gas turbines. The invention is also applicable to boilers that run on heavy oil, petroleum coke, residual oils from petrochemical plants, and other fuels.

2. Prior Art

In plants that generate power by means of boilers and gas turbines, a substantial portion of the operating cost is occupied by fuels and in order to reduce it, inexpensive heavy oils (including petroleum coke, asphalt and various residual oils from oil refinery) are often employed. However, heavy oils contain various corrosive compounds of elements represented by sodium (Na), sulfur (S) and vanadium (V) and this causes the problem of serious corrosive wear in hot structural members of boilers and gas turbines which come into direct contact with gases that are produced by the combustion of heavy oils. In particular, the moving blades and stationary vanes of gas turbines are subject to extreme wear for two reasons: firstly, unlike heat transfer pipes in boilers, such blades and vanes are not subjected to the strong cooling action of water vapor; secondly, recent models of gas turbines are designed to produce hotter combustion gases with a view to achieving more efficient power generation.

Various approaches have been proposed for solving this problem of hot corrosion which occurs in power generating gas turbines that are operated on heavy oils (which are hereunder called "heavy oil-burning gas turbines"). Among these approaches are:

(1) the corrosive compounds of elements such as Na, S and V contained in heavy oils are removed either physically or chemically thereby preparing less corrosive heavy oil fuels;

(2) the moving blades and stationary vanes which make direct contact with hot combustion gases are formed of materials that resist the corrosive action of the combustion gases at elevated temperatures;

(3) the surfaces of the moving blades and stationary vanes are protected with coatings that are highly resistant to corrosion at elevated temperatures;

(4) cooling air is allowed to flow effectively through the interior of the moving blades and stationary vanes so that their surface temperatures are sufficiently lowered to retard the reaction of corrosion which occurs at elevated temperatures; and (5) a corrosion inhibitor is added to heavy oil, which is then burnt so that the inhibitor reacts chemically with the corrosive compounds in the heavy oil, thereby converting them to non-corrosive compounds.

However, these approaches have their own problems as described below and it is necessary to develop more effective and economical alternatives.

The first approach which relies upon removing corrosive components from heavy oils suffers the problem that many of the corrosive compounds are oil-soluble and cannot be separated by simple procedures; in particular, it is quite expensive and hence uneconomical to remove S and V compounds from heavy oils, although this is technically feasible.

In order to improve the hot corrosion resistance of the moving blades and stationary vanes of gas turbines in the second approach, addition of metal components such as chromium and aluminum is effective but then such additives will deteriorate the high-temperature strength and the machinability of the blades and the vanes; thus, moving blades and stationary vane parts have yet to be developed that satisfy both requirements for resistance to hot corrosion and high-temperature strength.

The third approach which relies upon protecting the surfaces of moving blades and stationary vanes with coatings that are highly resistant to corrosion at elevated temperatures has been practiced for quite many years. This method has the advantage that there is a comparatively great degree of freedom in the choice of metal components for the protective coating since it does not require the high-temperature strength needed by the blades and the vane materials but resistance to hot corrosion will suffice. This method has proved to be capable of inhibiting the occurrence of corrosion in gas turbines that use fuels of good quality which do not contain much impurities; however, no satisfactory results have been achieved with heavy oil-burning gas turbines of the type contemplated by the invention.

The fourth approach which relies upon lowering the temperatures of moving blades and stationary vanes by means of air cooling is not applicable to all situations since the inevitable use of an increased amount of the cooling air lowers the efficiency of turbine operation.

The fifth approach which burns heavy oils after addition of corrosion inhibitors is adopted most extensively with heavy oil-burning gas turbines. In this method, the Na salts in a heavy oil are removed by extraction with hot water and, thereafter, compounds of Mg, Ca, Ba, Si, etc. are added to the heavy oil, which is burnt thereby allowing the added compound to react chemically with the Na, S and V compounds in the heavy oil so that their corrosive action is inhibited.

Many corrosion inhibitors have so far been proposed for addition to heavy oils and, to mention a few, they are: oxides of Fe, Al, Zn and Sn, as well as stearates of these metals (Japanese Patent Publication No. 8430/1954); organic compounds of metals such as Co, Mn, Fe, Cu, Ca, Ba and Mg (Japanese Patent Publication No. 9663/1968); oxides such as $MgO$, $CaO$, $SiO_2$, $Cr_2O_3$, $Al_2O_3$ and $Fe_2O_3$ (Japanese Patent Publication No, 29283/1973, Japanese Patent Public Disclosure (Laid-Open) No. 66873/1977, and Japanese Patent No. 1,094,783); MgO and other high-melting point compounds (U.S. Pat. Nos. 2,949,008 and 3,002,825); aluminum silicate (Swiss Patent No. 314,443); and calcium silicate (U.S. Pat. No. 2,843,200).

A problem with the addition of these corrosion inhibitors is the inevitable increase in the amount of combustion residues (ash) which deposit on the surfaces of moving blades and stationary vanes. Although the corrosion inhibitors are effective in preventing the occurrence of corrosion at elevated temperatures, their deposits will narrow the channel for the passage of combustion gases and the resulting increase in draft resistance will lower the operating efficiency of gas turbines.

In Japan and other countries which depend heavily upon imported petroleum for use as fuels, the fuel price is so high that more than 85% of the cost for operating gas turbines is occupied by fuels. In this situation, it is critical to prevent the drop in the efficiency of gas turbine operation and, hence, power generation, no matter how small it will be.

SUMMARY OF THE INVENTION

An object, therefore, of the invention is to provide a method for efficient operation of a heavy oil-burning gas turbine which uses a fuel that has various high-melting point compounds added with a view to preventing the occurrence of corrosion at elevated temperatures.

In heavy oil-burning gas turbines that employ corrosion inhibitors, the added inhibitors will deposit progressively on the surfaces of moving blades and stationary vanes as the time of their addition is prolonged and if the amount of their deposit increases unduly, the draft resistance will increase accordingly, which eventually lowers the efficiency of turbine operation. The invention provides a method of avoiding these problems.

DETAILED DESCRIPTION OF THE INVENTION

Figure 1A:
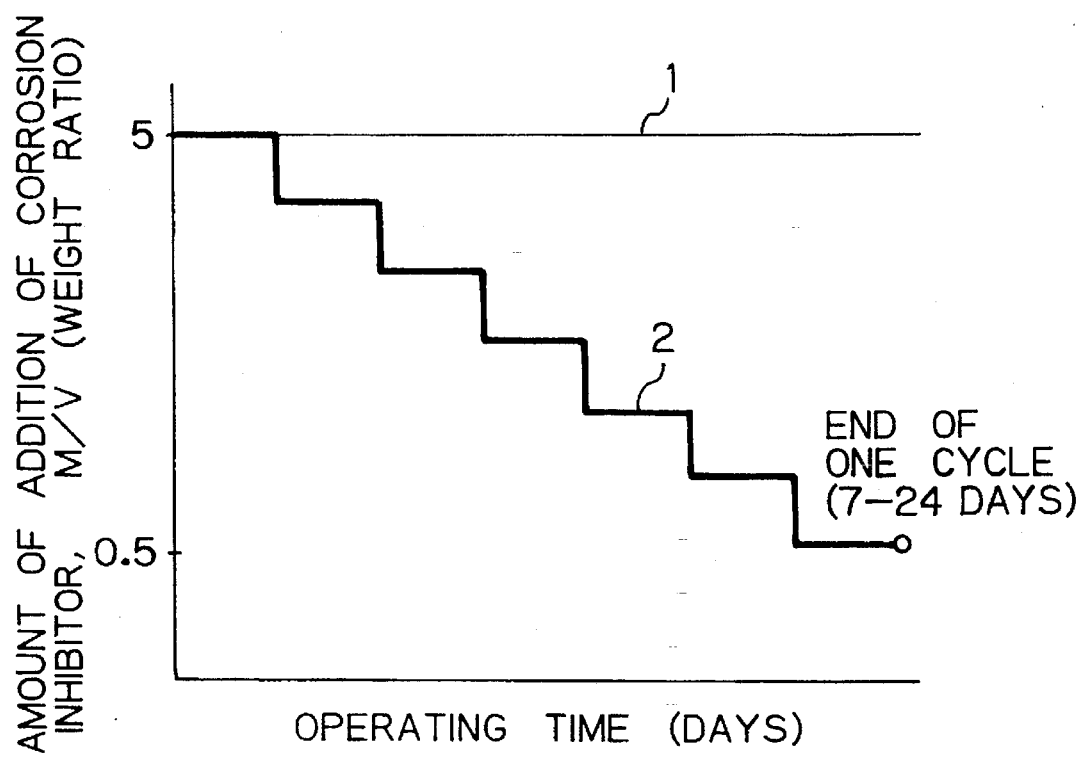
FIG. 1A is a graph comparing diagrammatically the profile of continuously adding a corrosion inhibitor in a heavy oil-burning gas turbine in a fixed amount (indicated by horizontal line 1) with the profile of addition in amounts that decrease stepwise (indicated by staircase 2)

The present inventors made extensive studies in order to prevent the drop in operating efficiency which frequently occurs in gas turbines that burn heavy oils mixed with corrosion inhibitors if they deposit excessively on the surfaces of the moving blades and stationary vanes. The corrosive damage that occurs at high temperatures in the moving blades and stationary vanes of a heavy oil-burning gas turbine is caused mainly by the Na, S and V compounds contained as impurities in the heavy oil fuel. To inhibit the corrosive action of these compounds, inorganic or organic compounds of elements such as Mg, Ca, Ba and Si are added to the heavy oil but the mechanism by which the added compounds inhibit corrosion is quite intricate as will be described later. Nevertheless, it has now been established as a result of our various tests that the content of impurity vanadium (V) in a heavy oil fuel suffices as a single index for corrosion inhibition and practically satisfactory results could be attained by adding corrosion inhibitors in such a way that the weight ratio of the effective metallic component (M) of each inhibitor to the corrosive component (V) of the fuel was set to lie within the range of M/V=2–5 in the initial period of turbine operation.

According to the invention, inorganic or organic compounds of Mg, Ca, Ba, Si and other inhibiting elements are added to a heavy oil in amounts that decrease in either a stepwise or graded manner depending upon the state of gas turbine operation. If it is to be restarted after shutdown inspection or after replacement of moving blades or stationary vanes, the corrosion inhibitor is added in an increased amount so that the deposit layer formed on the surfaces of moving blades or stationary vanes has a sufficiently high concentration of the corrosion inhibitor to prevent the corrosion of the blade and vane parts. Thereafter, the addition of the corrosion inhibitor is reduced in either a stepwise or graded manner over one cycle of operation within one to six weeks which has been predetermined empirically in consideration of the heavy oil used and the operating conditions of the gas turbine, such that the amount of the corrosion inhibitor added at the end point is one to three tenths of the initial addition. After the end of one cycle, the deposit on the moving blades and stationary vanes of the turbine is washed away with warm water (40°–70° C.) and the turbine is now ready for another cycle of operation.

If the corrosion inhibitor is added to a heavy oil by the above-described stepwise or graded method, a deposit rich in the corrosion inhibitor forms on the surfaces of moving blades or stationary vanes which appear as if they were covered with corrosion resistant coatings. Once such protective coatings have formed, subsequent additions of the corrosion inhibitor to the heavy oil can be reduced without permitting the combustion residue rich in corrosive compounds of Na, S, V, etc. to attack the surfaces of moving blades or stationary vanes. This is the operating theory on which the invention is based.

A gas turbine operating on this principle uses a smaller amount of the corrosion inhibitor and hence requires a lower cost of inhibitor addition than turbines that employ the conventional method in which a fixed amount of the corrosion inhibitor is continuously added to heavy oils. At the same time, the increase in the draft resistance due to excessive deposition of the added inhibitor on the surfaces of moving blades and stationary vanes is sufficiently reduced to suppress the drop in the operating efficiency of turbines.

EMBODIMENTS OF THE PRACTICE OF THE INVENTION

The corrosive damage that develops at elevated temperatures on the surfaces of moving blades and stationary vanes of a heavy oil-burning gas turbine is principally due to the Na, S and V compounds contained as impurities in heavy oil fuels and the respective elements are present in the following states:

Na: contained as a component of sea water (NaCl);

S: contained as aliphatic or aromatic oil-soluble sulfur compounds;

V: contained as oil-soluble complex compounds.

The compounds of these three elements react with one another in the environment of heavy oil combustion to generate new compounds, which will deposit on the surfaces of moving blades or stationary vanes of the gas turbine. For example, NaCl as a component of sea water undergoes the following reaction:

$$2NaCl + SO_2 + \tfrac{1}{2}O_2 + H_2O \rightarrow Na_2SO_4 + 2HCl \quad (1)$$
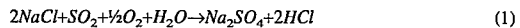

The sulfur compounds are all converted to oxides ($SO_2$ and $SO_3$) during combustion and react with the Na compound according to equation (1) thereby taking part in the formation of $Na_2SO_4$. The V compounds turn to oxides ($V_2O_3$ and $V_2O_4$) in the environment of combustion, eventually forming $V_2O_5$ which has high vapor pressure and low melting point and which are highly corrosive.

Additionally, $Na_2SO_4$ react with $V_2O_5$ to generate various compounds according to the following schemes:

$$28Na_2SO_4 + 12V_2O_5 \rightarrow 24NaVO_3 + 16Na_2SO_4 + 12SO_3 \quad (2)$$
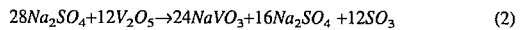

$$28Na_2SO_4 + 12V_2O_5 \rightarrow 5Na_2O \cdot V_2O_4 \cdot 11V_2O_5 + 23Na_2SO_4 + 5SO_3 + \tfrac{1}{2}O_2 \quad (3)$$
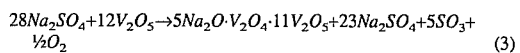

$$28Na_2SO_4 + 12V_2O_5 \rightarrow 2(Na_2O \cdot V_2O_4 \cdot 5V_2O_5) + 26Na_2SO_4 + 2SO_3 + O_2 \quad (4)$$
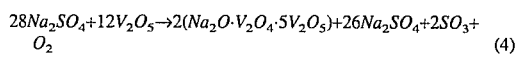

These final compounds and the initial products of heavy oil combustion have the melting points listed in Table 1 below and are characterized by melting at comparatively low temperatures. Hence, under the operating conditions of gas turbines, the compounds listed in Table 1 become molten and adhere to the surfaces of moving blades and stationary vanes; at the same time, they dissolve away the metal oxide films that have formed on the surfaces of the blades and vanes, thereby depriving their protective capability so that the blade and vane parts are heavily oxidized or worn by sulfurization.

The various corrosion inhibitors added to heavy oils will chemically react with the low-melting and highly corrosive compounds listed in Table 1 either in the environment of combustion or on the surfaces of moving blades or stationary vanes so that the melting points of those compounds are sufficiently raised to insure their solidification, thereby reducing the tendency of those compounds to enter into the reaction of corrosion.

TABLE 1

| Corrosive compounds generated by heavy oil combustion | Melting Point, °C. |
| --- | --- |
| $V_2O_5$ | 690 |
| $Na_2O.V_2O_5$ | 630 |
| $Na_2O.3V_2O_5$ | 621 |
| $5Na_2O.V_2O_4.11V_2O_5$ | 535 |
| $Na_2O.V_2O_4.5V_2O_5$ | 625 |
| $Na_2SO_4$ | 884 |

Suppose here that MgO or CaO is added as the corrosive inhibitor and that the low-melting, corrosive compound present is $V_2O_5$; if the two react with each other, the four complex oxides having high melting points which are listed in Table 2 below are generated to mitigate the corrosive attack by the $V_2O_5$ compound. Table 2 also shows that the greater the amount of the corrosive inhibitor that is added, the higher the melting point of the complex oxide that is generated and, hence, the less corrosive it is. It is, therefore, concluded that a greater inhibiting effect is achieved by adding increased amounts of corrosion inhibitors to heavy oils.

TABLE 2

| Complex oxide from Mg-containing corrosion inhibitor | Melting point, °C. | Complex oxide from Ca-containing corrosion inhibitor | Melting point, °C. |
| --- | --- | --- | --- |
| $2MgO.V_2O_5$ | 835 | $2CaO.V_2O_5$ | 778 |
| $3MgO.V_2O_5$ | 1191 | $3CaO.V_2O_5$ | 1016 |

On the other hand, the extensive use of the corrosion inhibitors means that their components deposit in large amounts on the surfaces of moving blades or stationary vanes to increase the resistance to the passage of combustion gases, thereby lowering the operating efficiency of turbines; in addition, the increased consumption of the corrosion inhibitors results in a higher running cost.

To avoid these problems, the present invention adds the corrosion inhibitor to a heavy oil in a large amount only in the initial period of turbine operation to insure that an adequately large amount of the inhibiting components will be present in the combustion residues (mixtures of the corrosive components in the heavy oil with the added inhibiting components) which make direct contact with the surfaces of moving blades or stationary vanes; subsequently, the addition of the corrosion inhibitor is reduced in either a stepwise or graded manner such that the initially attained state can be maintained for a prolonged period. Stated more specifically, at the early stage of turbine operation, protective coatings are formed of the combustion residues which are rich in the corrosion inhibiting components and, thereafter, the addition of the corrosion inhibitor is progressively reduced as the operation of the gas turbine continues and yet the blades or vanes are kept protected against corrosion for the necessary period as long as the layers rich in the inhibitor are present on the surfaces of the blades or vanes. By adopting this method, the drop in the operating efficiency of turbines can be decreased and, at the same time, the corrosion inhibitor can be saved.

The corrosion inhibitors that can be used in the invention are the inorganic and organic compounds of Mg, Ca, Ba and Si. If the inhibitor contains both Ca and Mg as in the case of naturally occurring dolomite, the initial addition may be such that the ratio of the sum of Ca and Mg in the dolomite to V lies between 2 and 5 with the subsequent addition being reduced in either a stepwise or graded manner.

Figure 1B:
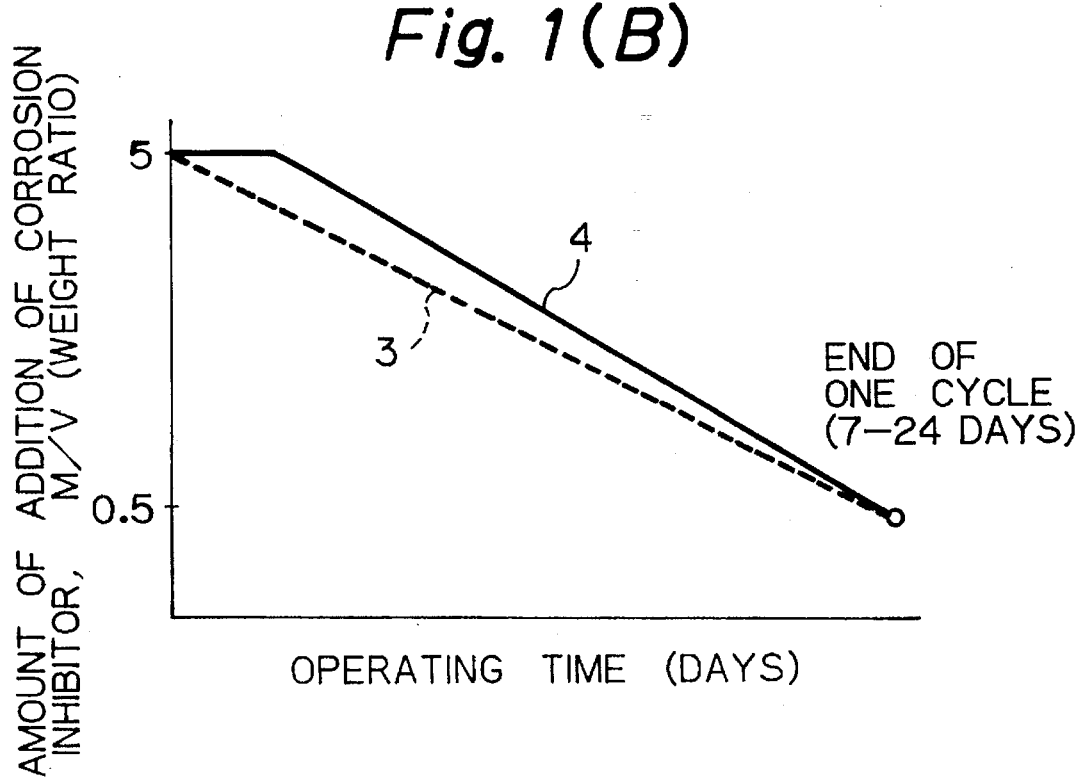
FIG. 1B is a graph comparing diagrammatically the profile of adding a corrosion inhibitor in a heavy oil-burning gas turbine in a monotonically decreasing amount (indicated by slope 3) with the profile of addition by the combination of methods 2 and 3 (indicated by kinked line 4).

As described on the foregoing pages, the invention is characterized by adding a corrosion inhibitor to a heavy oil such that the amount added is reduced in either a stepwise or graded manner. A cycle of the addition by these methods is shown schematically in FIGS. 1A and 1B. Horizontal line 1 in FIG. 1A refers to the case of adding a fixed amount of the corrosion inhibitor continuously by the conventional method; the dose of addition may occasionally be varied somewhat depending on the need but the duration of constant addition is long. Staircase 2 in FIG. 1A refers to the "stepwise" method of the invention, in which the addition of the corrosion inhibitor is reduced at intervals of 2 or 3 days or a week. Slope 3 in FIG. 1B refers to the "graded" method of the invention, in which the addition of the corrosion inhibitor is reduced daily and continuously. It should be noted that adding the corrosion inhibitor according to the profile indicated by kinked line 4 in FIG. 1B (the combination of 2 and 3) is also practically feasible.

The following are specific examples of the corrosion inhibitor that may be used in the invention.

Mg-containing inhibitor: MgO, $Mg(OH)_2$, $MgCO_3$, $MgSO_4$, $Mg(COOH)_2$, and oil-soluble organic Mg compounds (Mg stearate and Mg oleate);

Ca-containing inhibitor: CaO, $Ca(OH)_2$, $CaCO_3$, $CaSO_4$, $Ca(COOH)_2$, and oil-soluble organic Ca compounds (Ca stearate and Ca oleate);

Mg-Ca containing inhibitor: $MgCO_3 \cdot CaCO_3$, and mixtures of the Mg- and Ca-containing inhibitors listed above;

Si-containing inhibitor: $SiO_2$, ethyl silicate and methyl silicate; and

Others oxides, hydroxides, carbonates and sulfates of Al, Ba and Fe, as well as naturally occurring talc and kaolin.

These compounds are used after they are added to heavy oils in one of the following states: an aqueous solution or a slurry thereof, an oil solution or a slurry thereof, and a fine powder.

The following examples are provided for the purpose of further illustrating the present invention but are in no way to be taken as limiting.

EXAMPLE 1

The corrosive action of $V_2O_5$ as a corrosive component of a heavy oil and the effect of various corrosion inhibitors added to the heavy oil were investigated using an experimental heavy oil firing furnace.

1. Test Samples

A Ni-base alloy commercially used as a constituent material of moving blades (0.12 wt % C—15.0 wt % Cr—28.5 wt % Co—37.5 wt % Mo—2.2 wt % Ti—3.0 wt % Al—bal. Ni) was finished to a size of 12 mm$^\phi$×100 mm$^L$, thereby preparing test samples.

2. Heavy Oil

A commercial grade of C fuel (2.5 wt % S; 30–35 ppm of V; 3–5 ppm of Na) was used as a fuel.

3. Corrosion Inhibitors

The following compounds were selected as corrosion inhibitors, which were added to the heavy oil and stirred well so that they were dispersed uniformly.

(1) Mg(OH)$_2$ The addition of this compound was varied such that the weight ratio of Mg to V in the heavy oil was 0.3, 1.0, 2.0, 3.0 and 4.0.

(2) MgSO$_4$ Same as above.

(3) Ca(OH)$_2$ Same as above, except that the criterion was the weight ratio of Ca to V.

(4) Ba(OH)$_2$ Same as above, except that the criterion was the weight ratio of Ba to V.

(5) SiO$_2$ Same as above, except that the criterion was the weight ratio of Si to V.

4. Test Conditions

The heavy oil identified under 2 was burned in the combustion furnace both in the absence or presence of the corrosion inhibitors. With the test samples mounted in the passageway of the combustion gases, the furnace was operated at 850° C. for 100 continuous hours.

5. Evaluation of the Corrosion Inhibiting Effect

To evaluate the effectiveness of the corrosion inhibitors used, the weight of each test sample was measured both before and after the corrosion test and the difference was calculated. After the test, the corrosive components and the corrosive inhibitors present in the heavy oil deposited in large amounts on the surfaces of the individual test samples, so they were subjected to weight measurement after the deposits were washed away with warm water (50° C.), followed by drying.

6. Test Results

The test results are summarized in Table 3, from which one can see that the heaviest corrosion occurred in the combustion atmosphere which was solely composed of the heavy oil in the absence of corrosion inhibitors. In contrast, less corrosion occurred in the combustion gases that were produced by burning the heavy oil in the presence of the corrosion inhibitors. Particularly great inhibiting effects were exhibited by the Mg- and Ca-containing compounds. It was also clear that the amount of corrosion decreased with the increased use of the corrosion inhibitors; speaking of the Mg- and Ca-containing compounds, the amount of corrosion that occurred when the weight ratio of the added Mg or Ca to V was 3.0 or 4.0 was less than a tenth of the amount that occurred in the absence of corrosion inhibitors.

TABLE 3

| Run No. | Corrosion inhibitor | Amount of corrosion, mg/cm$^2$/100 h | | | | | |
|---|---|---|---|---|---|---|---|
| | | No additive | M/V = 0.3 | M/V = 1.0 | M/V = 2.0 | M/V = 3.0 | M/V = 4.0 |
| 1 | Heavy oil alone | 64.0 | — | — | — | — | — |
| 2 | Mg(OH)$_2$ | — | 31.1 | 10.8 | 4.8 | 2.5 | 1.8 |
| 3 | MgSO$_4$ | — | 34.5 | 12.5 | 5.2 | 2.9 | 2.0 |
| 4 | CaCO$_3$ | — | 38.1 | 18.0 | 8.0 | 3.1 | '3.5 |
| 5 | Ba(OH)$_2$ | — | 48.7 | 31.2 | 20.5 | 12.5 | 12.8 |
| 6 | SiO$_2$ | — | 54.0 | 38.1 | 31.5 | 22.5 | 28.0 |

Note: M in M/V represents Mg, Ca, Ba or Si.

Table 4 shows the results of X-ray diffraction as conducted on the deposits adhering to the surfaces of the test samples. Obviously, the corrosion inhibitors deposited in sulfate and oxide forms, which covered the surfaces of the test samples, thereby retarding the reactions for corrosion that occurred with the test samples.

TABLE 4

| Run No. | Corrosion inhibitor | Compounds Identified by X-ray Diffraction |
|---|---|---|
| 1 | Heavy oil alone | NaVO$_3$, Na$_2$SO$_4$, NiO |
| 2 | Mg(OH)$_2$ | MgSO$_4$, MgO, 2MgO.V$_2$O$_5$, Na$_2$SO$_4$ |
| 3 | MgSO$_4$ | MgSO$_4$, MgO, 2MgO.V$_2$O$_5$, Na$_2$SO$_4$ |
| 4 | CaCO$_3$ | CaSO$_4$, CaO, 2CaO.V$_2$O$_5$, Na$_2$SO$_4$ |
| 5 | Ba(OH)$_2$ | BaSO$_4$, BaO, Na$_2$SO$_4$ |
| 6 | SiO$_2$ | SiO$_2$, Na$_2$SO$_4$ |

Note: The test specimens subjected to X-ray diffraction had surface adhesion compounds as determined by conducting a corrosion test at M/V = 3.0 (where M is Mg, Ca, Ba or Si).

EXAMPLE 2

In Example 1, the effectiveness of corrosion inhibitors was demonstrated, but no investigation could be made in respect to the increase in the resistance to the passage of combustion gases which would occur in actual models of gas turbines as a result of the deposition of corrosion inhibitors on the surfaces of the blades and vanes. This was the objective of Example 2, in which an investigation of interest was conducted with an actual model of gas turbines.

1. Specifications of the Gas Turbine Used (1) Output power generated 13,200 kV (2) Maximum gas temperature 788° C.

(3) Fuel used Heavy oil

2. Fuel (Heavy Oil)

The gas turbine was operated on a commercial grade of heavy oil containing 30–50 ppm of Na, 2.5–3.0 wt % of S and 25–45 ppm of V. Prior to use, the Na content was reduced to the range 1.8–4.5 ppm by washing with water.

3. Corrosion Inhibitor and Profiles of Its Addition

Mg(OH)$_2$ was used as a corrosion inhibitor and added according to one of the following schemes.

(1) Prior art method: Added for 4 continuous weeks with Mg/V in the heavy oil held at 2.8.

(2) Invention method: For the first week of turbine operation, Mg/V was held at 2.8 and at 1-week intervals in the subsequent period, Mg/V was reduced stepwise to lower leaves, 1.8, 1.0 and 0.5; the total operating period was four weeks as in the prior art method.

4. Results of Evaluation

The increase in the draft resistance due to the deposition of the corrosion inhibitor on the surfaces of the blades and vanes and the resulting drop in turbine output was investigated by measuring the output from the generating end of the turbine for four weeks starting with the first addition of the corrosion inhibitor. In the prior art method of addition, an output power of 12,800 kW was generated at the initial stage of inhibitor addition but it dropped to 12,400 kW in four weeks. In the invention method of stepwise addition, the respective power outputs were 12,800 kW and 12,600 kW and the drop in power output was 1.56% less than in the prior art method.

After the end of turbine operation, the surfaces of the moving blades and stationary vanes of the turbine were examined for any exterior changes; there was no sign of corrosion in either case and both methods of inhibitor addition proved to be effective in controlling the occurrence of corrosion.

Samples were taken from the deposits on the surfaces of moving blades and stationary vanes of the turbine and subjected to X-ray diffraction, which revealed that the Mg added to the fuel heavy oil had formed three compounds, $MgSO_4$, MgO and $2MgO \cdot V_2O_5$; this verified that the added Mg created a corrosion inhibiting environment which was substantially the same as outlined in Table 4.

EXAMPLE 3

The heavy oil-burning gas turbine which was supplemented with the same corrosion inhibitor as used in Example 2 was operated for four continuous weeks, then brought to shutdown and restarted. The resultant changes in the output from the power generating end of the turbine were investigated. Whether the corrosion inhibitor was added by the prior art method or the invention method, an output recovery of 0.82 MW was achieved compared to the output generated immediately before the shutdown. This could be explained as follows: the corrosion inhibitor was deposited on the surfaces of moving blades and stationary vanes of the rubbing turbine (while hot) and as the blades and vanes cooled down after the shutdown, the great thermal expansion mismatch between the constituent materials of the blades and vanes and the corrosion inhibitor creased a shear stress at the interface between the surface of each blade and vane and the inhibitor, whereby the latter dislodged and came off the blades and vanes thereby reducing the resistance to the passage of combustion gases.

After restarting the turbine, the corrosion inhibitor was added continuously by both the prior art method and the second invention method and the turbine was run for an additional four weeks. The second invention method adopted the following "graded" profile of addition. In the initial period of restarting, the corrosion inhibitor was added in the same dose as in the prior art method (Mg/V=2.8) but subsequently, the addition was progressively reduced by daily decrements of Mg/V=0.66 until Mg/V reached 0.5 in the fourth week.

Four weeks after the restarting of the gas turbine, the output from its power generating end was measured, revealing that the output drop that occurred in the "graded" method was 1.8% less than the drop which occurred in the prior art method; it was, therefore, verified that the second invention method was also effective in reducing the drop in turbine's output power.

EXAMPLE 4

In Example 4, the effectiveness of the invention was investigated on an actual model of gas turbines that employed a fuel having smaller contents of Na, S and V than the heavy oil used in Examples 1–3.

1. Specifications of the Gas Turbine
   Same as used in Example 1.
2. Fuel Oil
   Na: 1–2 ppm, S: 0.5–0.8 wt %, V: 1–2 ppm
3. Corrosion Inhibitors and Changes in the Profile of their Addition
   (1) MgO
   (2) $SiO_2$ The oil contained only a small amount of V but in order to suppress the corrosive action of the Na and S compounds in the oil, the turbine was started up with the inhibitors being added in such doses that Mg/V and Si/V were each controlled at 5. Subsequently, the inhibitor was added by both the prior art method and the first (stepwise) method of the invention. After turbine was operating for a predetermined period, the drop in the output from its power generating end and the state of corrosion that occurred in the blades and vanes were investigated. In the prior art method, the corrosion inhibitor was added for six continuous weeks; in the "stepwise" method, the dose was reduced progressively at 1-week intervals such that Mg/V decreased from 5, 3, 2, 1 and 0.5 to 0.1.

4. Results of Evaluation

The drop in the output from the power generating end of the turbine was measured by the same method as in Example 2. In the case of the Mg-containing corrosion inhibitor (MgO), the drop in output was 6.3% when it was added continuously in a fixed amount but the drop was only 5.5% when the inhibitor was added in amounts that decreased stepwise; in the case of the Si-containing inhibitor (SiO), the drop in output was 5.8% when it was added continuously in a fixed amount but the drop was only 4.7% when the inhibitor was added in amounts that decreased stepwise. However, the surfaces of the blades treated with SiO experienced a greater degree of discoloration than the blades treated with MgO and it was predictable that the corrosion would increase gradually in the future operation of the turbine.

As described above in detail, the invention provides a method for operating a gas turbine on a heavy oil supplemented with a corrosion inhibitor for the purpose of preventing the occurrence of corrosion in the moving blades and stationary vanes of the turbine, such method characterized in that in the initial period of turbine operation, the inhibitor is added in a sufficiently large dose to insure that deposits rich in the inhibiting components are formed on the surfaces of moving blades and stationary vanes as if they were protective coatings and that thereafter the dose of the inhibitor is progressively reduced in either a stepwise or graded manner as the turbine operation continues. By adopting this method, the following advantages will result:

(1) The use of the corrosion inhibitor is reduced, thereby cutting the running costs of the gas turbine;

(2) The amount of the corrosion inhibitor that deposits on the surfaces of the moving blades and stationary vanes of the turbine is sufficiently reduced to suppress the increase in the resistance to the passage of combustion gases; and (3) The advantage (2) in turn reduces the drop in the output from the power generating end of the turbine, thereby helping improve the thermal efficiency of the turbine.

What is claimed is:

1. In a method of operating a heavy oil-fueled gas turbine such that a compound of at least one element selected from among Mg, Ca, Ba and Si is added as a corrosion inhibitor to a heavy oil fuel thereby preventing the occurrence of corrosive damage to the gas turbine, the improvement wherein the amount of addition of the corrosion inhibitor in the initial period of turbine operation is such that the weight ratio of the effective metallic component (M) of the inhibitor to the corrosive component (V) of the fuel is set to lie within the range of M/V=2–5 and that thereafter the addition of the inhibitor is reduced in either a stepwise or graded manner over a predetermined cycle of operation within one to six weeks until the amount of the inhibitor added at the end point is one to three tenths of the initial addition, whereby the deposition of the inhibitor on the surfaces of the moving blades and stationary vanes of the turbine is sufficiently inhibited to reduce the drop in the operating efficiency of the turbine.

2. A method according to claim 1, wherein after the end of one cycle of operation, the deposits on the moving blades and stationary vanes of the turbine are washed away with warm water at 40°–70° C. and only thereafter is another cycle of operation started.

* * * * *